United States Patent [19]

Marjollet et al.

[11] 4,342,570
[45] Aug. 3, 1982

[54] APPARATUS FOR SEPARATING DROPLETS OF LIQUID ENTRAINED IN A GAS OR A VAPOR

[75] Inventors: Jacques Marjollet, Paris; Jean-Claude Mevel, Les Ulis; Gérard Palacio, Montmorency; Gérard Tondeur, Velizy-Villacoublay, all of France

[73] Assignee: Societe Anonyme dite: Stein Industrie, Velizy-Villacoublay, France

[21] Appl. No.: 282,348

[22] Filed: Jul. 10, 1981

[30] Foreign Application Priority Data

Jul. 10, 1980 [FR] France ................. 80 15364

[51] Int. Cl.³ .......................... B01D 45/16
[52] U.S. Cl. .................... 55/418; 55/423; 55/424; 55/440
[58] Field of Search ............. 55/440, 423, 424, 418

[56] References Cited

U.S. PATENT DOCUMENTS

| | | | |
|---|---|---|---|
| 1,564,075 | 12/1925 | Lakin | 55/440 X |
| 2,921,647 | 1/1960 | Pietrasz | 55/440 X |
| 2,976,954 | 3/1961 | Irwin | 55/440 X |
| 3,405,511 | 10/1968 | Halter et al. | 55/440 |
| 3,564,820 | 2/1971 | Nelson | 55/440 X |
| 3,720,046 | 3/1973 | Kudirka et al. | 55/440 X |
| 4,002,444 | 1/1977 | Artemov et al. | 55/440 X |

FOREIGN PATENT DOCUMENTS 2431874 2/1980 France .
1,432,337 4/1976 United Kingdom ................. 55/440

*Primary Examiner*—Kathleen J. Prunner
*Attorney, Agent, or Firm*—Sughrue, Mion, Zinn, Macpeak and Seas

[57] ABSTRACT

The apparatus comprises: (a) stacked bundles of parallel corrugated wafers (4) between which the liquid droplet charged gas or vapour is made to flow, said bundles being housed between panels (e.g. 1) which are welded round all their edges to a support structure so as to define a horizontal gas or vapour flow direction between adjacent wafers; (b) gutters (9, 10, 11) for collecting the liquid running down the wafers, each gutter being located below a bundle of wafers; and (c) liquid drain tubes (12, 13, 14) for draining away the liquid collected by the gutters. The lower edges of the wafers are notched in such a manner as to catch drops of liquid flowing along said lower edges and cause them to drop into the gutters rather than being entrained by the flow of the gas or vapour.

Such apparatus is used in separator-superheaters as used in power stations that generate electricity by expanding steam through turbines.

7 Claims, 3 Drawing Figures

APPARATUS FOR SEPARATING DROPLETS OF LIQUID ENTRAINED IN A GAS OR A VAPOR

The present invention relates to apparatus for separating droplets of liquid entrained in a gas or a vapour, the apparatus comprising:

(a) bundles of parallel corrugated wafers between which the liquid droplet charged gas or vapour is made to flow, said bundles being housed between panels which are welded round all their edges to a support structure;

(b) gutters for collecting the liquid running down the wafers, said gutters being located below their corresponding bundles of wafers; and (c) tubes for draining away the liquid collected by the gutters.

BACKGROUND OF THE INVENTION

Known separator apparatuses use bundles of parallel corrugated wafers housed in panels that are bolted to a support structure. They generally also include a perforated sheet placed upstream from the bundles to spread out the incident flow of wet steam in a uniform manner. The perforated sheet is also bolted to the structure. Gutters are placed at the downstream end of the bundles of corrugated wafers. The gutters are of polygonal right cross section and serve to collect the water trapped by the corrugations of the wafers which water runs over the wafers and along their bottom edges. Drain tubes are connected to the gutters to remove the water.

Unfortunately, some drops of water get past the bundles of wafers and are entrained in the supposedly dried steam. One of the ways this can happen is for the water trapped by the wafers to flow under the effect of capillarity along their bottom edges and to form drops thereon which are then entrained by the flow rather than dropping into the gutters.

Preferred embodiments of the present invention considerably reduce the amount of water that gets past the apparatus in this manner.

SUMMARY OF THE INVENTION

The present invention provides apparatus for separating droplets of liquid entrained in a gas or a vapour, the apparatus comprising:

(a) stacked bundles of vertically disposed, parallel corrugated wafers between which the liquid droplet charged gas or vapour is made to flow, said bundles being housed between panels which are welded round all their edges to a support structure so as to define a horizontal gas or vapour flow direction between adjacent wafers;

(b) gutters for collecting the liquid running down the wafers, said gutters being located below their corresponding bundles of wafers; and (c) tubes for draining away the liquid collected by the gutters; wherein the lower edges of the wafers are notched in such a manner as to catch drops of liquid flowing along said lower edges and to cause them to drop into the gutters rather than being entrained by the flow of the gas or vapour.

Preferably the apparatus includes at least one of the following features.

The wafers have at least one notch in their upper edges to make up a groove in the upper edge of a bundle of wafers, said groove receiving a transverse bar whose upper edge is welded to the underside of one of said panels that covers the bundle, thereby preventing wet gas or vapour from flowing over the top of a bundle without passing therethrough.

The right cross section of the gutters is substantially semi-circular.

The upstream end of the gutters are tilted against the direction of gas or vapour flow at an angle such that the diameter across the end edge of a gutter is at about 35° to the vertical.

The liquid drain tubes are disposed behind the panels in the direction of flow.

The drain tubes are connected to the downstream end of respective gutters, and the gutters slope down gently from their middles to their downstream ends.

The apparatus may further include a perforated panel disposed upstream of the rest of the apparatus to spread out the flow of wet gas or vapour over the bundles of corrugated wafers, said perforated panel forming an integral part of the support structure.

BRIEF DESCRIPTION OF THE DRAWINGS

An embodiment of the present invention is described by way of example with reference to the accompanying drawings in which.

DETAILED DESCRIPTION

Figure 1:
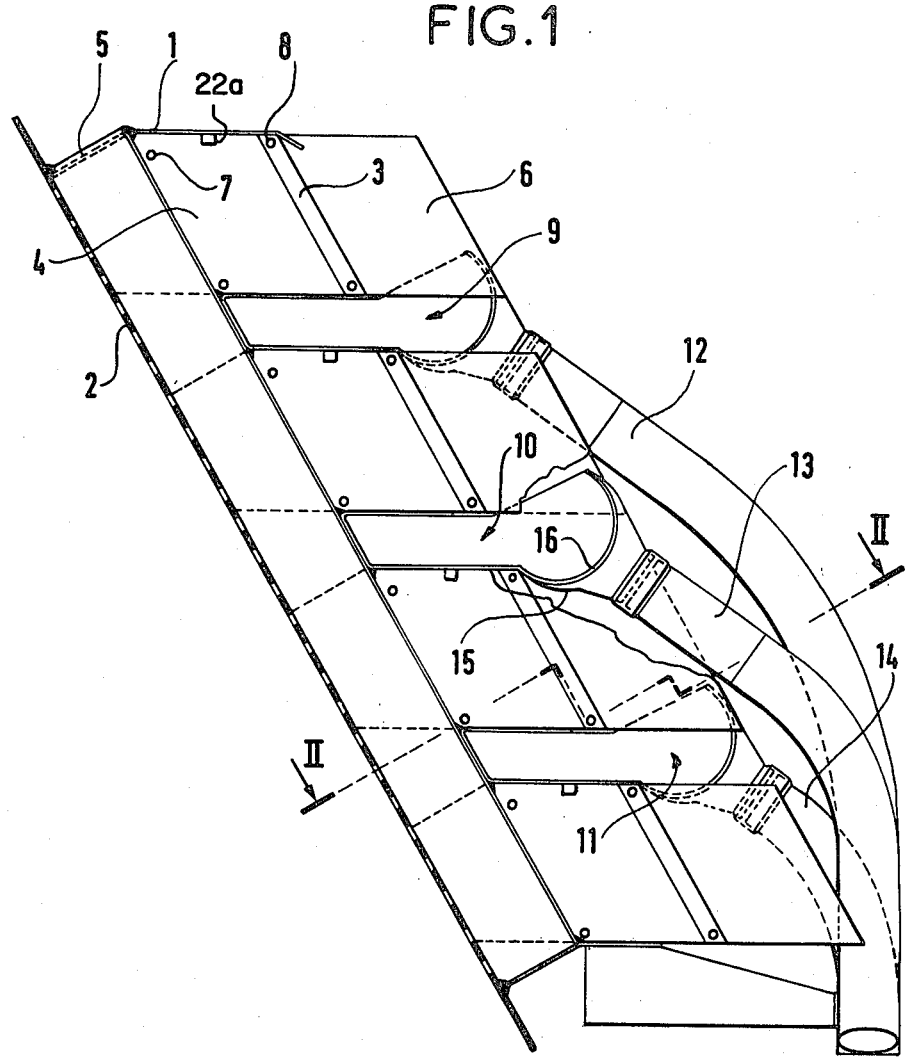
FIG. 1 is a partially cut-away elevation of a portion of apparatus in accordance with the invention.

In FIG. 1, fixing panels 1 for fixing corrugated wafers such as 4 are welded to a support structure having sides 3 visible in the figure. The support structure also includes perforated sheets and front and rear rods such as 7 and 8 passing through holes in the perforated sheets perpendicularly to the plane of the figure, and holding them fast to each other and to the sides 3. In front of the panels 1, there is a perforated sheet 2 for spreading out the flow of wet steam uniformly. The perforated sheet 2 is welded to forwardly projecting sheets 5 which are themselves welded to the support structure. To the rear of the bundles of corrugated wafers 4 there are vertically disposed plane sheets 6 for regulating the flow of dry steam.

Gutters 9, 10 and 11 of semi-circular right section run along the lower edges of the bundles of corrugated wafers to collect the water trapped by the corrugations and running down along the wafers. The gutters are tilted towards the flow of steam in such a manner that the diameter across the end edge of each gutter is at 35° to the vertical. Drain tubes 12, 13 and 14 are connected to the downstream end of each gutter to drain away the collected water to a suitable recipient. To improve the flow of water in the gutters towards the drain tubes, the gutters slope down from their middles to their downstream ends rather than being exactly horizontal. This can be seen for the gutter 10 in the cut away portion of the figure where the bottom of the gutter at 15 is lower than the bottom of its section 16 in the plane of the figure.

Figure 2:
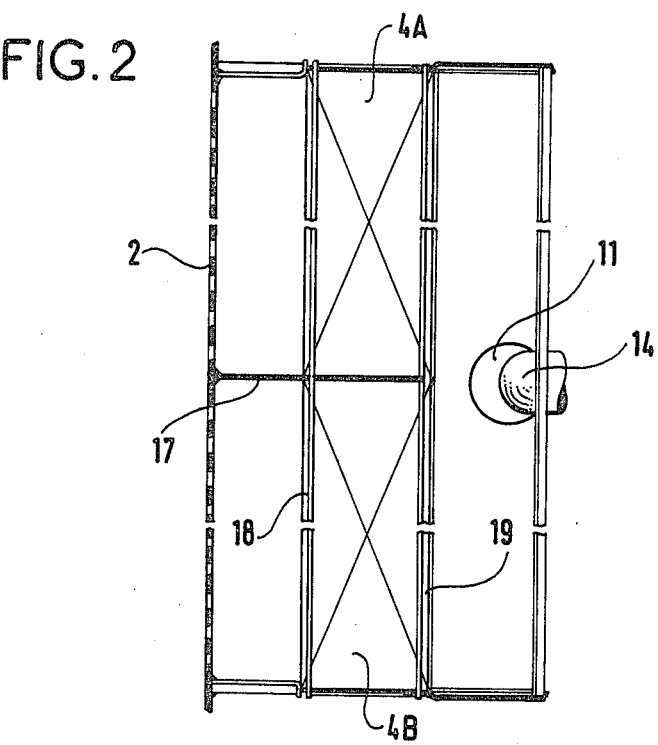
FIG. 2 is a cross section of FIG. 1 along a line II—II.

FIG. 2 is a cross section showing more clearly how adjacent bundles 4A and 4B of corrugated wafers are housed in the panels of the support structure with a partition 17 between the two bundles and with rods 18 and 19 passing through the entire assembly.

Figure 3:
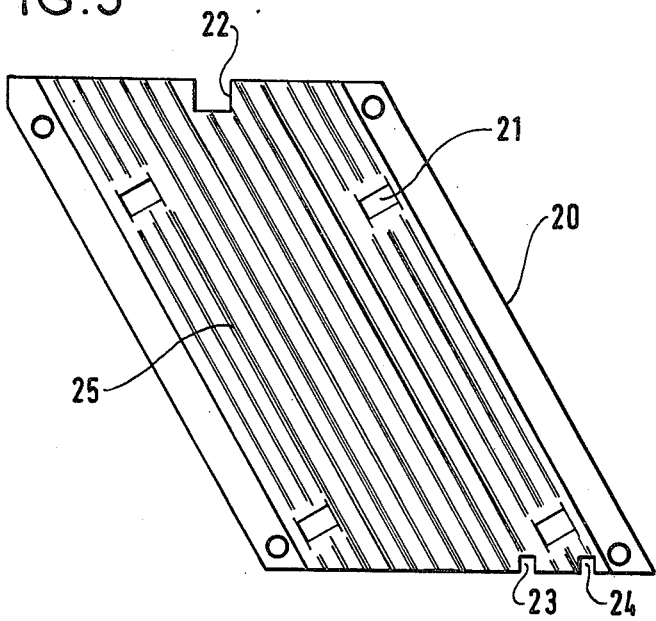
FIG. 3 is a diagrammatic side view of a corrugated wafer showing notches in its upper and lower edges for preventing, or at least considerably reducing, the flow of unwanted water downstream from the apparatus.

FIG. 3 shows a corrugated wafer 20, with corrugations 25 represented diagrammatically to keep the figure legible. Bumps shown diagrammatically at 21 enable the wafers to press against one another. A notch 22 in the upper edge of the wafer receives a perpendicularly disposed bar 22a which is welded to the underside of the upper firing panel to prevent wet steam from flowing around the bundles of corrugated wafers. The lower edge of the wafer has two smaller notches 23 and 24 to catch the film of water flowing over the wafer by the capilliary effect and thereby prevent the water from being entrained by the passing flow of dried steam.

Although the embodiment of the invention which has been described is the preferred embodiment, it will be understood that numerous modifications can be made without going beyond the scope of the invention as claimed.

The invention is intended for use in steam separator-superheaters in electricity power generating stations that operate by expanding steam in turbines having several pressure stages. It has thus been described with particular reference to a steam embodiment, but the same principles apply to other flows of wet gas or vapour.

We claim:

1. Apparatus for separating droplets of liquid entrained in a gas or a vapour, the apparatus comprising:
   (a) stacked bundles of vertically disposed, parallel corrugated wafers between which the liquid droplet charged gas or vapour is made to flow, said bundles being housed between panels which are welded round all their edges to a support structure so as to define a horizontal gas or vapour flow direction between adjacent wafers;
   (b) a gutter disposed at the lower edge of each bundle to collect the liquid running down the wafers; and
   (c) a drain tube connected to each gutter so that the liquid collected by the gutters is drained away and wherein the lower edges of the wafers are notched in such a manner as to catch drops of liquid flowing along said lower edges and cause them to drop into the gutters rather than being entrained by the flow of the gas or vapour.

2. Apparatus according to claim 1, wherein the wafers have at least one notch in their upper edges to make up a groove in the upper edge of a bundle of wafers, said groove receiving a transverse bar whose upper edge is welded to the underside of one of said panels that covers the bundle, thereby preventing wet gas or vapour from flowing over the top of a bundle without passing therethrough.

3. Apparatus according to claim 1, wherein the configuration of the right cross section of the gutters is substantially semi-circular.

4. Apparatus according to claim 3, wherein the upstream end of said gutters are tilted against the direction of the gas or vapour flow at an angle such that the diameter across the end edge of a gutter is at about 35° to the vertical.

5. Apparatus according to claim 1, wherein the liquid drain tubes are disposed behind the panels in the direction of flow.

6. Apparatus according to claim 1, wherein the drain tubes are connected to the downstream end of respective gutters, and wherein the gutters slops down gently from their middles to their downstream ends.

7. Apparatus according to claim 1, further including a perforated panel disposed upstream of the rest of the apparatus to spread out the flow of wet gas or vapour over the bundles of corrugated wafers, said perforated panel forming an integral part of the support structure.

* * * * *